United States Patent
Wilkins

(10) Patent No.: US 9,793,675 B1
(45) Date of Patent: Oct. 17, 2017

(54) JET ENGINE GAS LASERS

(71) Applicant: THE BOEING COMPANY, Chicago, IL (US)

(72) Inventor: Donald F. Wilkins, St. Louis, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/347,379

(22) Filed: Nov. 9, 2016

(51) Int. Cl.
| | |
|---|---|
| G02B 26/00 | (2006.01) |
| H01S 3/03 | (2006.01) |
| H01S 3/086 | (2006.01) |
| B64D 27/16 | (2006.01) |
| F02K 1/78 | (2006.01) |
| G02F 1/29 | (2006.01) |
| G02B 26/08 | (2006.01) |

(52) U.S. Cl.
CPC ............... *H01S 3/03* (2013.01); *B64D 27/16* (2013.01); *F02K 1/78* (2013.01); *G02B 26/0825* (2013.01); *G02F 1/29* (2013.01); *H01S 3/086* (2013.01); *G02F 2201/34* (2013.01)

(58) Field of Classification Search
CPC . H01S 3/03; H01S 3/086; B64D 27/16; F02K 1/78; G02B 26/0825; G02B 26/0833; G02F 1/29; G02F 2201/34
USPC .......... 359/290–292, 298, 224.1; 385/15, 16, 385/18, 25; 244/15, 74 R, 207
See application file for complete search history.

(56) References Cited

FOREIGN PATENT DOCUMENTS

WO    WO 2005033498    *   4/2005

OTHER PUBLICATIONS

Asadchy et al., "Functional Metamirrors Using Bianisotropic Elements," Physical Review Letters 114, 095503, Mar. 6, 2015, 6 pages.
Moitra et al., "Experimental demonstration of a broadband all-dielectric metamaterial perfect reflector," Applied Physics Letters 104, 171102, 2014, 6 pages.
Smalikho et al. "Measurement of Atmospheric Turbulence by 2-μm Doppler Lidar," American Meterological Society, 2005, 15 pages.
Sun et al, "Large-Scale Optical Phased Arrays Enabled by Silicon Photonics," CLEO: 2013 Technical Digest © OSA, 2013, 2 pages.
Optonicus, "Intelligent Optical Systems," retrieved on Nov. 9, 2016, [http://www.optonicus.com/], 3 pages.

* cited by examiner

*Primary Examiner* — James Phan
(74) *Attorney, Agent, or Firm* — Hanley, Flight & Zimmerman, LLC

(57) ABSTRACT

Jet engine gas lasers are disclosed. A disclosed example apparatus includes a jet engine, and first and second opposing mirrors exposed to an exhaust gas flow path of the jet engine, where at least one mirror of the first and second opposing mirrors is adjustable to generate laser light energy using exhaust gas of the jet engine.

23 Claims, 11 Drawing Sheets

JET ENGINE GAS LASERS

FIELD OF THE DISCLOSURE

This disclosure relates generally to lasers and, more particularly, to jet engine gas lasers.

BACKGROUND

Known laser systems typically employ equipment/hardware that has significant weight, power usage, cost and complexity. Therefore, integration of these known laser systems with vehicles such as aircraft can involve significant cost and/or complexity. Further, integration of such laser systems may require additional supporting components or hardware, which can negatively impact vehicle weight, maneuverability and/or fuel efficiency.

For example, known laser systems also often have very significant energy requirements, which can necessitate supporting power infrastructure (e.g., additional power supply hardware and/or wiring infrastructure) as well as complex integration of the supporting electrical/power equipment, which can be difficult to accommodate in vehicles.

SUMMARY

An example apparatus includes a jet engine, and first and second opposing mirrors exposed to an exhaust gas of a flow path of the jet engine, where at least one mirror of the first and second opposing mirrors is adjustable to generate laser light energy using exhaust gas of the jet engine.

An example aircraft includes an opposing mirror pair disposed within or proximate a jet engine of the aircraft, and a translucency adjuster to alter a translucency of an adjustable mirror of the opposing mirror pair to generate laser light energy based on jet engine gas of the jet engine.

An example method includes determining a target location, and generating a laser light beam aimed towards the target location from exhaust gas of a jet engine, where the laser light beam is to be generated using an opposing pair of mirrors disposed in or proximate the jet engine.

Another example method includes assembling an opposing mirror pair to an internal surface of a jet engine, and coupling a light energy transfer cable between at least one mirror of the opposing mirror pair and a laser turret.

Figure 1:
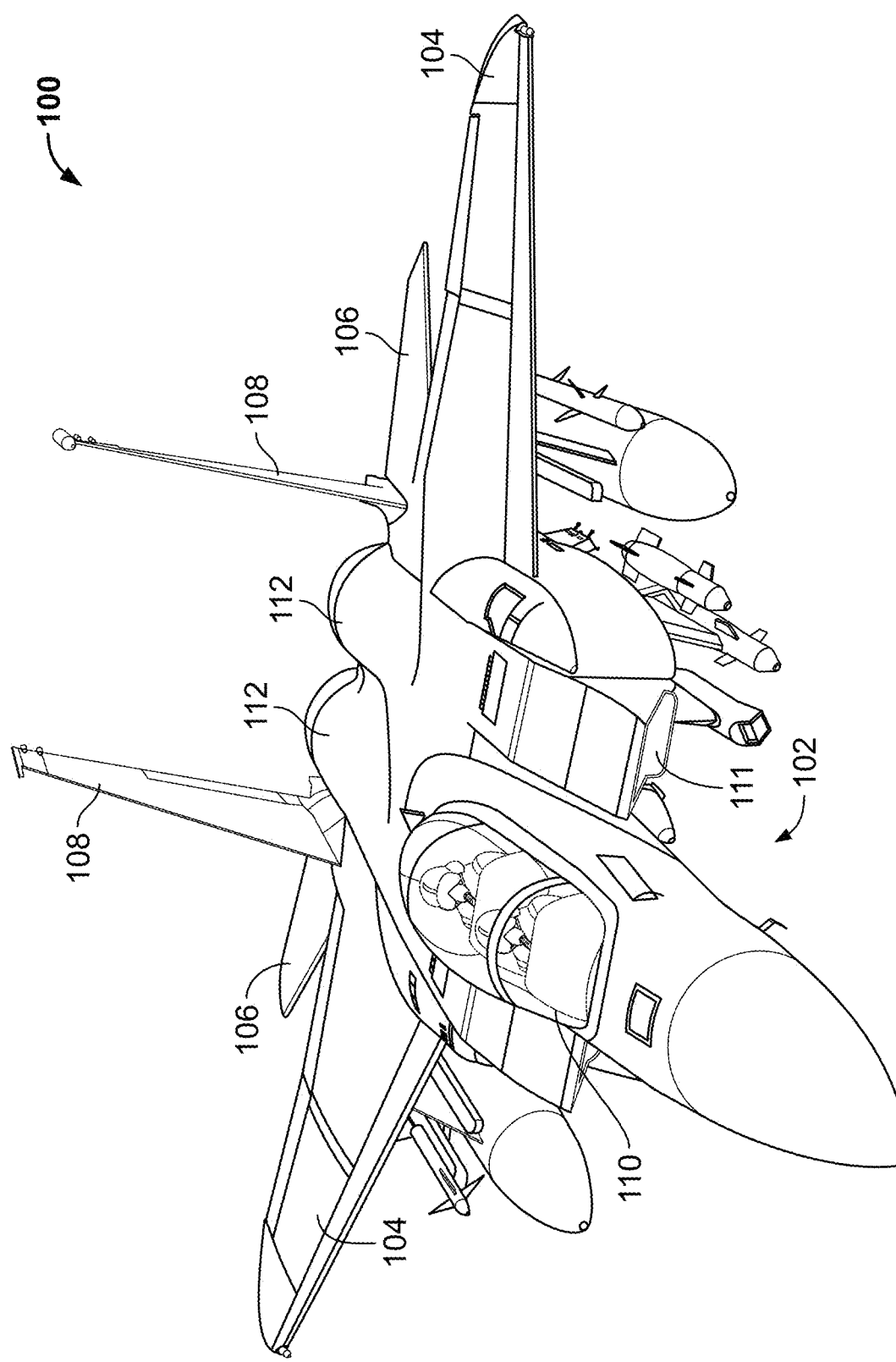
FIG. 1 illustrates an example aircraft in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Jet engine gas lasers are disclosed. Known laser systems are difficult to integrate into vehicles such as aircraft or boats due to their large volume/weight needs as well as their very significant power/electric requirements. As a result, such requirements may require large and heavy supporting power equipment and/or infrastructure. Further, known laser systems often require a significant amount of other supporting equipment (e.g., protective equipment, optical equipment, power infrastructure, etc.). Therefore integration of these known laser systems may negatively impact weight, maneuverability, cost and/or fuel efficiency of vehicles.

The examples disclosed herein enable an energy efficient and effective generation of a laser from a vehicle (e.g., an aircraft, a boat, etc.) with a jet engine. The examples disclosed herein also enable cost-effective integration of such laser systems. To generate a laser in an energy efficient manner, the examples disclosed herein utilize jet engine gas (e.g., jet engine exhaust gas), which is already produced during jet propulsion, for example, as an energy source, thereby reducing and/or eliminating the power source equipment often necessary for laser generation, which can necessitate significant additional volume and/or weight. In other words, the examples disclosed herein eliminate bulky support equipment by integrating laser generation functionality with a propulsion system (e.g., a jet propulsion system).

To generate a laser light beam as a gas dynamic laser based on a jet propulsion system, the examples disclosed herein utilize opposing mirror pairs disposed within or proximate a jet engine, thereby reducing and/or eliminating the need for heavy and large power equipment typically required for laser integration. The examples disclosed herein generate the gas dynamic laser by altering an optical property, a reflectiveness, translucency and/or transparency of a mirror (e.g., an adjustable mirror) of an opposing mirror pair, which includes mirrors that are opposed across a diameter (e.g., a diameter of an internal volume, diametrically opposed) of a jet engine (e.g., an internal surface of the jet engine), for example. In some examples, the mirror and/or at least one mirror of the opposing mirror pair is at least partially composed of a metamaterial. In some examples, the generated gas dynamic laser is directed to a turret (e.g., a laser turret, a respective turret), which may be omnidirectional (e.g., a dome turret, etc.) and/or rotatable about multiple axes.

As used herein, the term "metamaterial" refers to a molecular structure and/or composition of a material having properties, which may not ordinarily occur in nature. Accordingly, the term "metamaterial" may refer to a material that changes properties when it is displaced/deformed and/or when subjected to a voltage, for example. As used herein the term "opposing" may refer to objects (e.g., mirrors, mirror directions, mirror focal points, etc.) being directly across from one another (e.g., directly facing one another) and/or generally facing towards one another, but not necessarily on opposite ends (e.g., opposite diametric ends) from one another. As used herein, the term "jet engine gas" refers to gas moving within, through or out of (e.g., an exhaust) a jet engine and/or an exhaust flow path of the jet engine that may include any of one of air, gas(es) and/or a gas mixture having fuel combustion products.

FIG. 1 illustrates an example aircraft 100 in which the examples disclosed herein may be implemented. The aircraft 100 of the illustrated example includes a fuselage 102, wings 104, horizontal stabilizers 106, vertical stabilizers 108, a cockpit 110, air intakes 111 and engines 112. In some examples, the aircraft 100 also includes a lift engine, in which the examples disclosed herein may also be implemented, that is used to raise the aircraft 100 in the vertical direction (e.g., in a hovering orientation) while the aircraft 100 generally faces forward (e.g., a vertical takeoff as seen in vertical takeoff and landing (VTOL) aircraft, etc.).

In operation, the engines 112, which are jet engines in this example, generate thrust to propel the aircraft 100 forward while the wings 104 generate lift. Accordingly, control surfaces on the wings 104, the horizontal stabilizers 106 and/or the vertical stabilizers 108 are used to maneuver the aircraft 100 while thrust is provided by combustion occurring at the engines 112. As will be described in greater detail below in connection with FIG. 2, the engines 112 utilizes an inflow of air from the air intakes 111 and subjects this inflow of air to compression, combustion and outflow/expansion to generate thrust to move the aircraft 100 forward.

Figure 2:
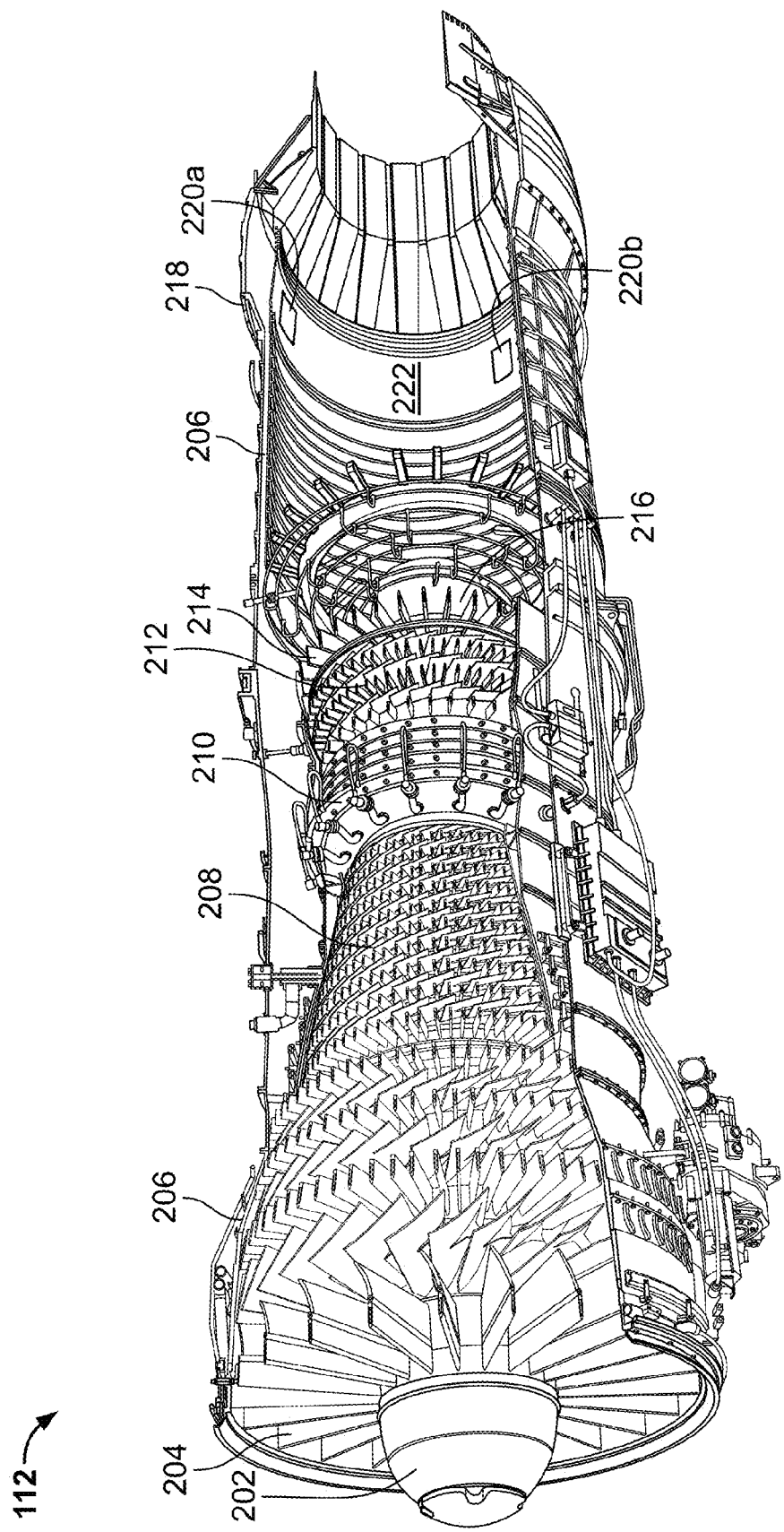
FIG. 2 illustrates a cutaway view of an example jet engine of the aircraft of FIG. 1 in accordance with the teachings of this disclosure.

FIG. 2 illustrates a cutaway view of the example jet engine 112 of the aircraft 100 of FIG. 1 in accordance with the teachings of this disclosure. According to the illustrated example of FIG. 2, the jet engine 112 defines an exhaust gas flow path and includes an inlet nozzle 202, a fan 204, an engine housing 206, a low-pressure compressor 208, a combustion chamber 210, a high-pressure turbine 212, a low-pressure turbine 214, an outlet nozzle 216, a rear portion 218 of the engine housing 206, and mirrors 220 (herein designated as mirrors 220a, 220b, etc.). In this example, the mirrors 220 are disposed on an inner surface 222 of the rear portion 218. In particular, the mirrors 220 are positioned past the outlet nozzle 216 along a direction of airflow (e.g., to the right of the outlet nozzle 216 in the view of FIG. 2) and are positioned as opposing pairs. In other words, the mirrors 220 of the illustrated example are mounted to be directed towards one another (e.g., directly facing one another).

To provide thrust for the aircraft 100, air from the air intakes 111 is drawn into the engine 112 by the low-pressure compressor 208 and the fan 204 and, in turn, passes the inlet nozzle 202. The compressor 208 of the illustrated example pressurizes the air within the engine 112. After the air is pressurized, the air is mixed with fuel to define a gas (e.g., jet engine gas) that is combusted in the combustion chamber 210, thereby driving the high-pressure turbine 212, which may be used to drive the compressor 208 in some examples. According to the illustrated example, the gas expands and cools as it moves toward and past both the low-pressure turbine 214 and the outlet nozzle 216, and outward from the engine 112 as jet engine exhaust.

To generate a laser (e.g., a laser light beam) based on this expansion of the gas, the mirrors 220 are positioned in an opposing arrangement to define a lasing cavity. In particular, as the gas expands after combustion, the gas is not in a thermodynamic equilibrium until vibrational states of the gas relax. As the gas flows away from the combustion chamber 210, low vibrational states of the gas relax but high vibrational states do not generally relax, thereby resulting in a population inversion of gas molecules of the gas. As a result, stimulated emission occurs between the mirrors 220. As will be described in greater detail below in connection with FIGS. 3-6, altering a reflectiveness and/or transparency of one mirror 220 of a respective opposing pair of the mirrors 220 causes a laser light beam to be generated which, in turn, can be routed away from the aircraft 100 and directed towards a target, for example.

Figure 3:
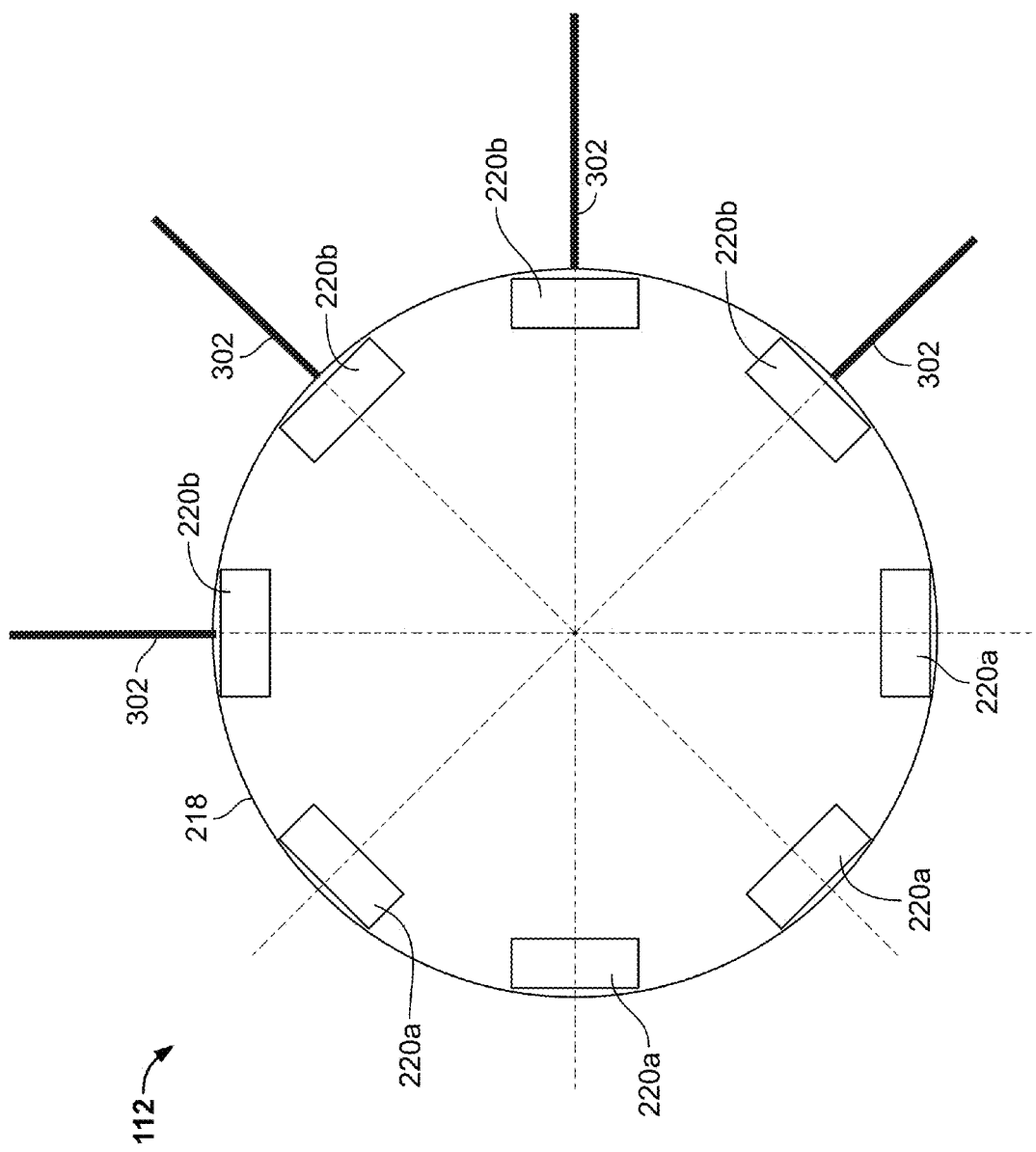
FIG. 3 is a cross-sectional view of the example jet engine of FIG. 2.

FIG. 3 is a cross-sectional view of the example jet engine 112 of FIG. 2. As can be seen in the illustrated example of FIG. 3, mirrors 220a are each opposed (e.g., diametrically opposed) to corresponding adjustable mirrors (e.g. metamaterial mirrors, metamirrors, etc.) 220b. The adjustable mirrors 220b may be at least partially composed of any combination of one or more of Copper, Silver, Silicon Dioxide, Silicon Carbide and/or Black Phosphorus, or any other appropriate material or compound. In this example, the mirrors 220b are coupled to light transfer cables (e.g., optical fiber, fiber optic cable, etc.) 302 that can transport the laser light/light energy. In this example, the mirrors 220a are fixed while the mirrors 220b are adjustable. In particular, one or more properties (e.g., optical properties) of the mirrors 220b may be varied/adjusted to alter a respective optical property, thereby allowing the mirrors 220b to act as a Q-switch, in which light pulses are generated instead of a continuous wave. For example, the mirrors 220b may change their reflectiveness and/or light emissivity based on an applied voltage and/or displacement and/or movement of the mirrors 220b. Additionally or alternatively, in some examples, the mirrors 220a and/or the mirrors 220b can be directed, rotated and/or re-oriented.

While numerous mirrors 220a, 220b are shown in this example, only a single pair including one of the mirrors 220a and one of the mirrors 220b may be necessary to define a lasing volume to generate a laser. In some examples, numerous mirrors 220a are directed to a single mirror 220b (e.g., a focal arrangement of multiple mirrors 220a, a laser generated by focusing multiple mirrors 220b). In some examples, all of the mirrors 220a, 220b are adjustable and a portion of these mirrors 220a, 220b in such examples are adjusted (e.g., altered) to generate a gas dynamic laser. Additionally or alternatively, different opposing pairs of the mirrors 220a, 220b are phased via voltage and/or reflectivity at different frequencies to harvest more energy from the jet engine exhaust. In some examples at least two of the optical cables 302 are joined/coupled to one another (e.g., their respective light energy is combined) via a junction.

Figure 4B:
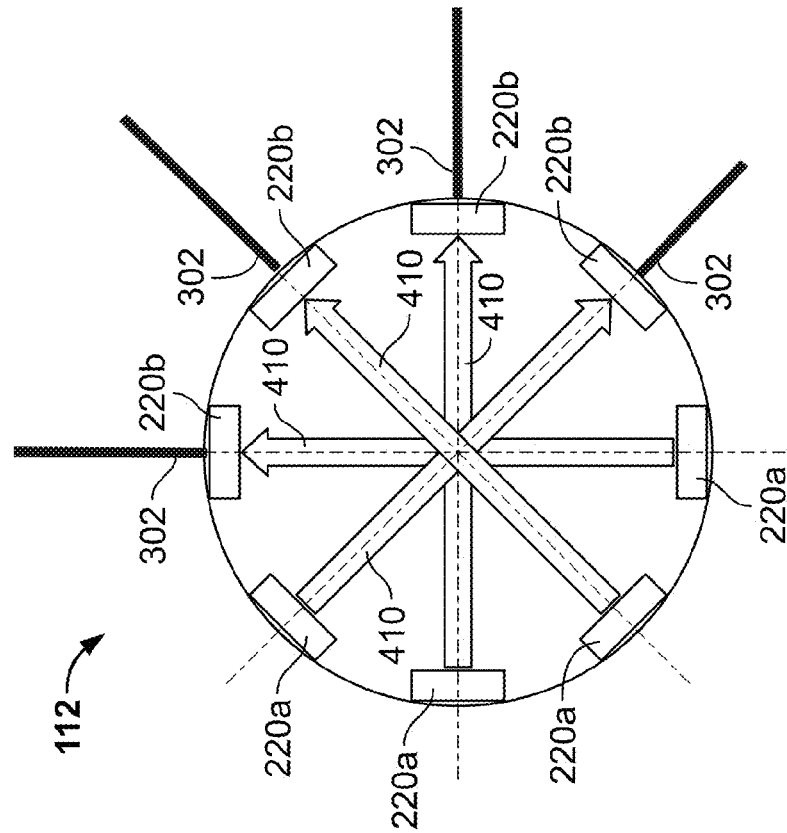
FIGS. 4A and 4B are cross-sectional views of the example jet engine of FIG. 2 depicted in a non-emitting state and an emitting state, respectively.
Figure 4A:
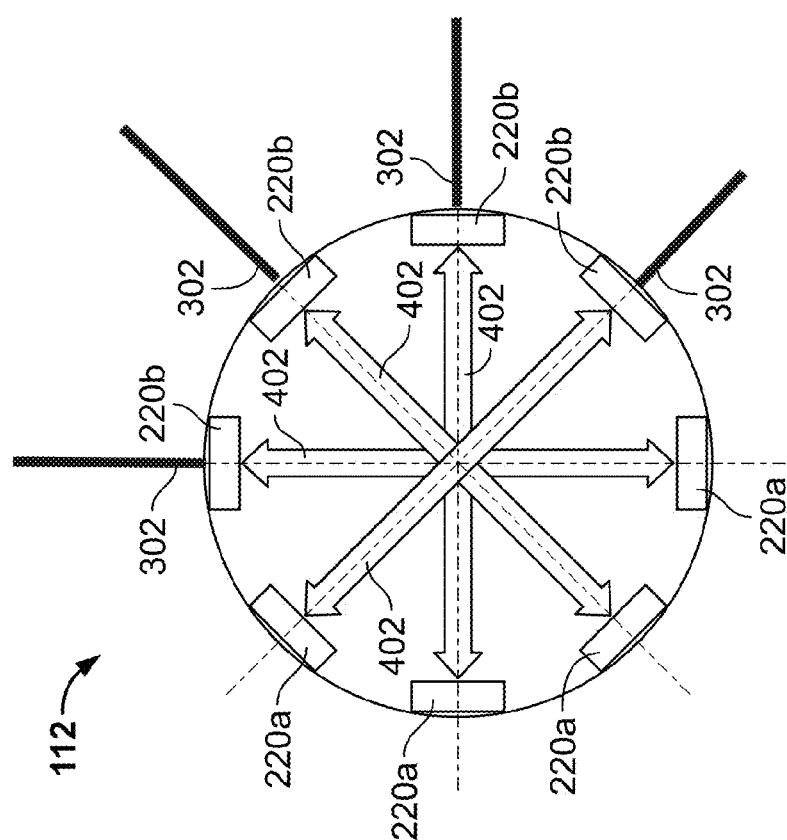

FIGS. 4A and 4B are cross-sectional views of the example jet engine 112 of FIG. 2 in a non-emitting state and an emitting state, respectively. Turning to FIG. 4A, the example mirrors 220a, which are not adjustable in this example, as well as the adjustable mirrors 220*b* are in their full reflective states. In other words, the mirrors 220*a* and the adjustable mirrors 220*b* are all fully reflective in this non-emitting state. As a result, light energy bounces repeatedly back and forth between each mirror 220*a* and a respective mirror 220*b*, as generally indicated by arrows 402 and, in turn, light energy is not transferred via the optical cables 302.

As shown in the illustrated example of FIG. 4B, an emitting state (e.g., a laser emitting state) is shown. In contrast to the non-emitting state described above in connection with FIG. 4A, the adjustable mirrors 220*b* of the illustrated example have been adjusted to alter their reflectiveness. As a result, light energy (e.g., net light energy) flows/moves from each mirror 220*a* to a respective mirror 220*b*, as generally indicated by arrows 410. In some examples, light energy is continuously reflected between the mirror 220*a* and the adjustable mirror 220*b* (e.g., back and forth) while a portion of this light energy moves to the respective optical cable 302. In particular, this continuous partial back and forth reflection of the light/light energy may occur when the adjustable mirror 220*b* is adjusted/altered to be partially reflective or fully transparent by a translucency adjuster, for example. In some examples, the reflectivity of the mirror 220*b* is periodically varied (e.g., cycled) (e.g., a sinusoid reflectivity pattern, a cyclical reflectivity pattern, a pulsed reflecting pattern, etc.).

Figure 5:
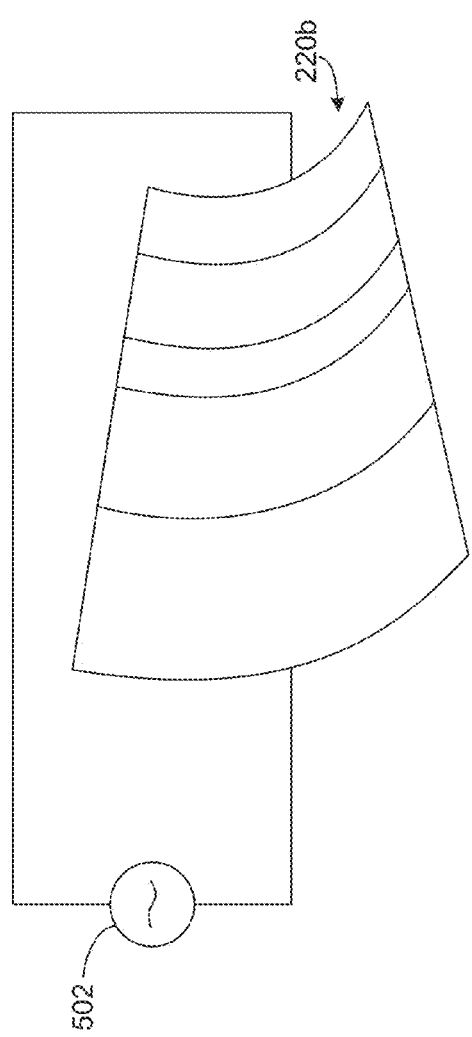
FIG. 5 illustrates an example mirror that may be implemented in the examples disclosed herein.

FIG. 5 illustrates the example mirror 220*b* that may be implemented in the examples disclosed herein. According to the illustrated example, a voltage is applied to the mirror 220*b* via a voltage source 502 to alter the reflective/optical properties of the mirror 220*b*. For example, the voltage from the voltage source 502 may be applied to reduce and/or eliminate reflectiveness of the mirror 220*b*. Additionally or alternatively, the applied voltage may alter (e.g., temporarily alter) a shape of the mirror 220*b*, thereby changing its optical properties. In some examples, the voltage applied by the voltage source 502 is pulsed and/or periodic.

Figure 6:
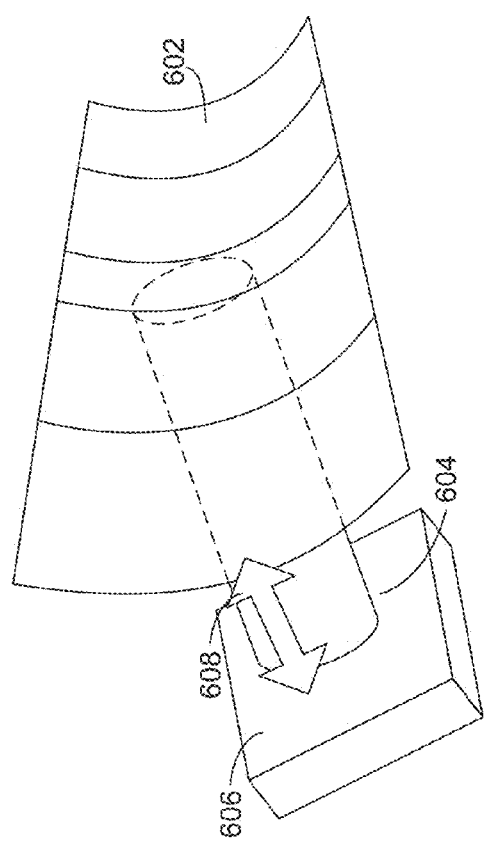
FIG. 6 illustrates an alternative example mirror that may be implemented in the examples disclosed herein.

FIG. 6 illustrates another alternative example adjustable mirror 602 that may be implemented in the examples disclosed herein. In contrast to the example mirror 220*b*, reflectiveness and/or optical properties of the mirror 602 are varied/altered based on displacement and/or deformation of the mirror 602 instead of an applied voltage. As can be seen in the illustrated example of FIG. 6, a contact device (e.g., a contact post, a contact portion, etc.) 604, which is operatively coupled to an actuator (e.g., a linear actuator) 606, is positioned behind a portion (e.g., a center portion) of the mirror 602.

To alter a reflectiveness of the example mirror 602, the contact device 604 is driven by the actuator 606 to contact, push and/or alter a shape of the mirror 602. In particular, the actuator 606 moves the contact device 604 forward and backward in a linear direction, as generally indicated by a double arrow 608. In this example, the contact device 604 displaces/moves a center of the mirror 602 to alter a curvature (e.g., an overall curvature) of the mirror 602, thereby altering a degree to which the mirror 602 reflects and/or transmits light energy.

While the contact device 604 is shown contacting a central region of the mirror 602, the contact device 604 may contact any portion of the mirror 602 to alter a shape of the mirror 602. In some examples, multiple contact devices are placed along an outer perimeter of the mirror 602 to change a shape of the mirror 602. In some examples, the contact device 604 is integral with the actuator 606. In some examples, an actuator is used to stretch the example mirror 602 to alter its optic properties. In other examples, a magnetic field is used to alter/vary a reflectiveness and/or optical properties of a mirror. For example, a metallic frame and/or magnetic frame that is embedded and/or surrounding such a mirror may displace and/or curve when a magnetic field is applied.

Additionally or alternatively, the contact device 604 acts to redirect a focal point and/or direction the mirror 602 faces (e.g., by deforming, bending and/or altering an overall shape of the mirror 602). In such examples, the contact device 604 may contact the mirror 602 at an off-center position of the mirror 602. In some examples, the mirror 602 may also vary optical characteristics based on an applied voltage in combination with altering and/or varying the shape of the mirror 602.

Figure 7A:
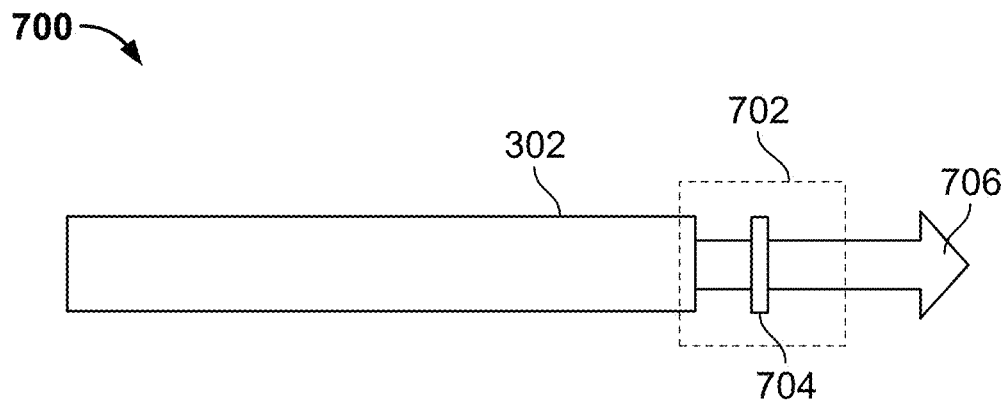
FIGS. 7A and 7B depict an example turret that may be implemented in the examples disclosed herein.
Figure 7B:
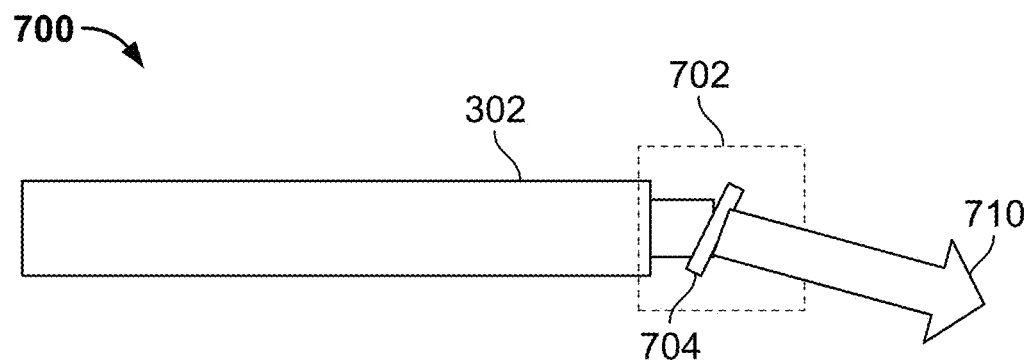

FIGS. 7A and 7B depict an example turret 700 that may be implemented in the examples disclosed herein. According to the illustrated example of FIG. 7A, the optical fiber 302, which is routed from at least one adjustable mirror 202*b*, is coupled at an end to a turret (e.g., an omnidirectional turret, an omnidirectional directed energy dome turret, etc.) 702, which includes a movable (e.g., a rotatable, a displaceable, etc.) mirror 704 disposed within. According to the illustrated example of FIG. 7A, light energy (e.g., a laser) travelling through the optical fiber 302 is directed by the movable mirror 704, as generally indicated by an arrow 706.

Turning to the illustrated example of FIG. 7B, which shows the example turret 700 aimed in a different direction from that shown in FIG. 7A, the mirror 704 of the turret 702 has been rotated to re-direct the light energy from the optical fiber 302 in a direction generally indicated by an arrow 710. In some examples, the turret 700 includes a cover, an iris structure/mechanism and/or switch to prevent emission of the laser until a desired time.

Figure 8A:
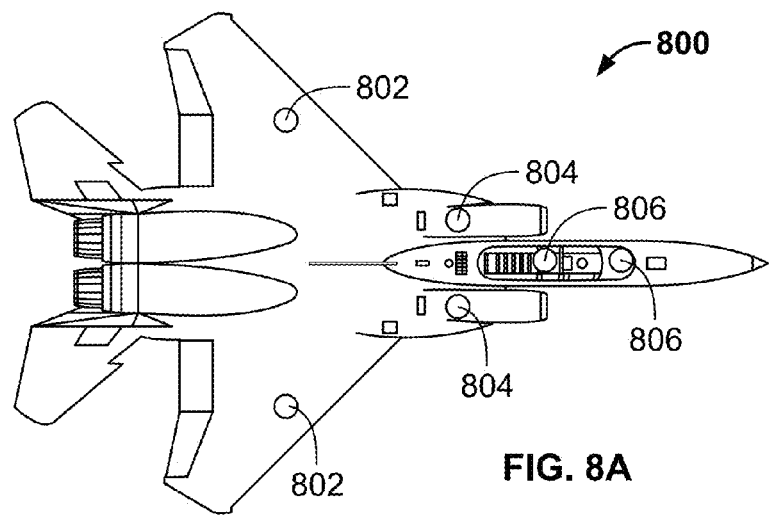
FIGS. 8A-8C depict example turret placement locations.
Figure 8B:
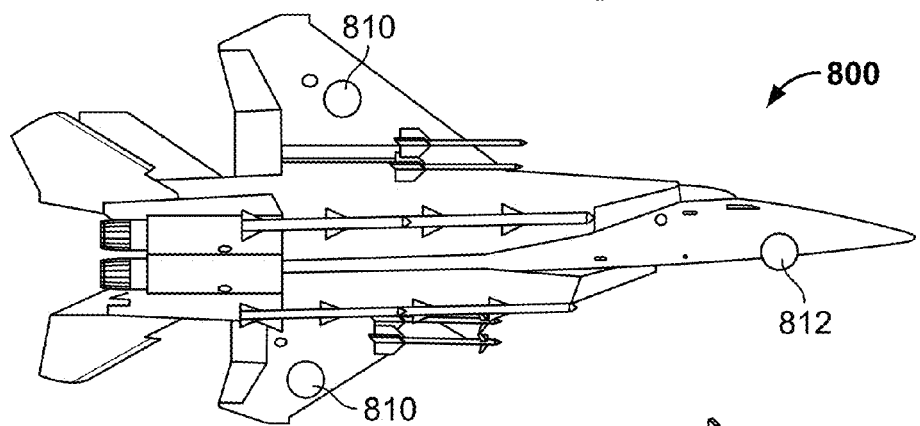
Figure 8C:
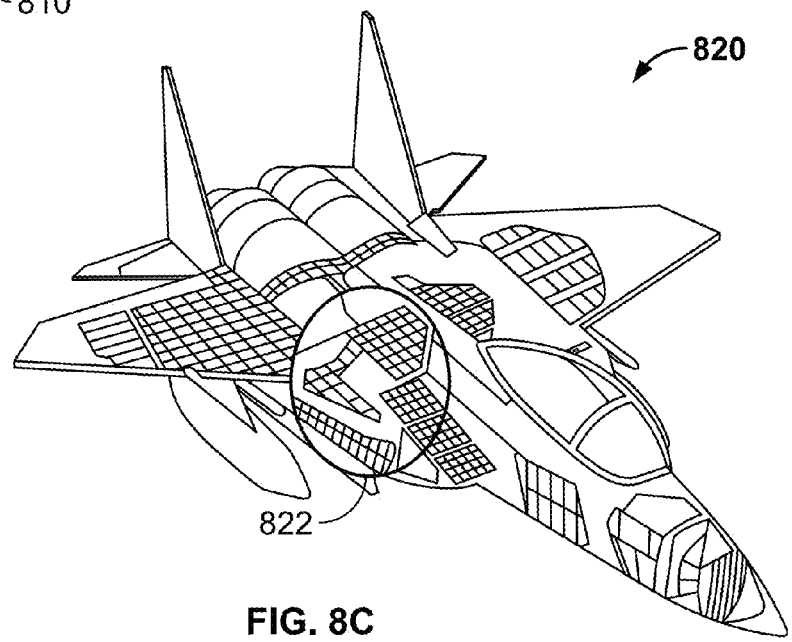

FIGS. 8A-8C depict example turret placement locations. FIG. 8A depicts an aircraft 800 with wing turrets 802, central turrets 804 and cockpit area turrets 806. According to the illustrated example, the aircraft 800 has multiple (i.e., two or more) engines and, thus, any of the wing turrets 802, the central turrets 804 and/or the cockpit area turrets 806 may be fired simultaneously. In other words, a first of the engines may provide light energy to a first laser turret while a second of the engines simultaneously provides light energy to a second laser turret. In these examples, the wing turrets 802, the central turrets 804 and the cockpit area turrets 806 are prevented from (e.g., via software, image recognition and/or mechanical range of motion limiters) emitting/discharging lasers directed toward other portions/obstructions of the aircraft 800 (e.g., a vertical stabilizer, a cockpit, etc. of the aircraft 800).

Turning to FIG. 8B, an underside of the aircraft 800 is shown. In this example, the aircraft 800 includes underside wing turrets 810 as well as a cockpit/nose region underside turret 812.

FIG. 8C illustrates an aircraft 820 with a forward facing laser turret area 822. In this example, a laser turret, which can be re-directed/aimed, is placed within the laser turret area 822. In other examples, the laser turret is not to be aimed and, instead, a pilot is to aim the turret by directing the aircraft 820 towards a desired target.

Figure 9:
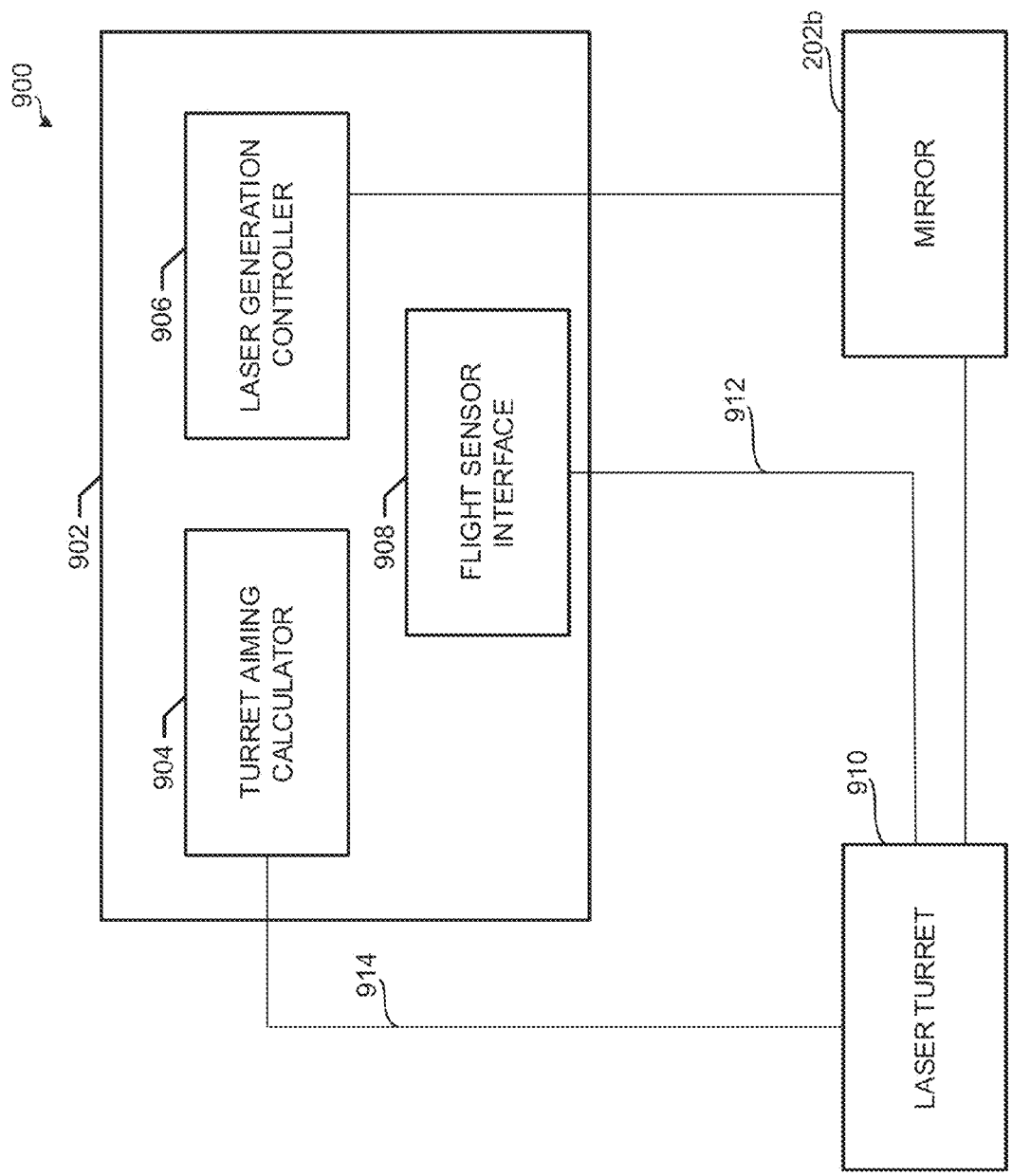
FIG. 9 is a schematic overview of an example laser control system that may be used to implement the examples disclosed herein.

FIG. 9 is an example turret control system 900 that may be used to implement the examples disclosed herein. The turret control system 900 of the illustrated example includes a laser calculation portion 902, which includes a turret aiming calculator 904, a laser generation controller 906, which is communicatively coupled to the mirror 202*b* and/or an interface of the mirror 202*b*, and a flight input/sensor interface 908. According to the illustrated example, the flight input/sensor interface 908 is communicatively coupled to a laser turret interface 910, which is used to orient the example turret 700, via a communication line 912. Further, in this example, the turret aiming calculator 904 is communicatively coupled to the laser turret interface 910 via a communication line 914.

To direct aiming of the turret 700, the turret aiming calculator 904 determines and/or calculates an orientation for a generated laser from the laser turret to be directed towards a target (e.g., a moving target). In this example, the turret aiming calculator 904 takes into account a vector, a predicted movement and/or velocity of the target to aim the turret 700. In some examples, the turret aiming calculator 904 also takes into account movement of the aircraft 100 (e.g., velocity, movement vector, etc. of the aircraft 100) from the flight input/sensor interface 908 when aiming the turret. Additionally or alternatively, the turret aiming calculator 904 takes into account atmospheric aberrations, other objects flying in the air and/or atmospheric objects (e.g., clouds, etc.). For example, the turret aiming calculator 904 may utilize an optical phase array of antennas to adjust for the aberrations and/or turbulence of the atmosphere to aim the turret.

According to the illustrated example, once the turret 700 is aimed, to generate the laser, the laser generation controller 906 directs the mirror 202b and/or the interface of the mirror 202b to change its reflectivity and/or optical parameters to generate a gas dynamic laser based on jet engine exhaust and/or expansion of jet engine gasses, as described above in connection with FIGS. 3-4B. In this example, the laser generation controller 906 alters a voltage applied to the mirror 202b. In other examples, the laser generation controller 906 directs the actuator 606 to actuate and alter a shape of and/or displace at least a portion of the mirror 602 to change an optical property of the mirror 602 to generate the gas dynamic laser.

In some examples, the laser generation controller 906 controls, determines and/or varies at least one parameter of the emitted laser. For example, the laser generation controller 906 may control a frequency, an energy level (e.g., a directed energy level), duration and/or a pulse sequence of the laser. Additionally or alternatively, the example laser generation controller 906 relies on sensor data and/or cockpit flight input from the flight input/sensor interface 908.

In some examples, the laser generation controller 906 controls multiple mirrors 202b. In some examples, the laser generation controller 906 directs multiple lasers to be emitted (e.g., from a top and a bottom of an aircraft) simultaneously. In some examples, the turret aiming calculator 904 determines a presence of a target in a direction at which the turret 700 is aimed and directs (e.g., automatically controls) the laser generation controller 906 to emit the gas dynamic laser. In some examples, the turret aiming controller 904 directs multiple laser turrets. In some examples, the turret aiming controller 904 accounts for atmospheric variations, air conditions and/or aberrations in directing the turret 700.

While an example manner of implementing the example turret control system 900 is illustrated in FIG. 9, one or more of the elements, processes and/or devices illustrated in FIG. 9 may be combined, divided, re-arranged, omitted, eliminated and/or implemented in any other way. Further, the example turret aiming calculator 904, the example laser generation controller 906, flight input/sensor interface 908 and/or, more generally, the example turret control system 900 of FIG. 9 may be implemented by hardware, software, firmware and/or any combination of hardware, software and/or firmware. Thus, for example, any of the example turret aiming calculator 904, the example laser generation controller 906, flight input/sensor interface 908 and/or, more generally, the example turret control system 900 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, turret aiming calculator 904, the example laser generation controller 906, and/or the example flight input/sensor interface 908 is/are hereby expressly defined to include a tangible computer readable storage device or storage disk such as a memory, a digital versatile disk (DVD), a compact disk (CD), a Blu-ray disk, etc. storing the software and/or firmware. Further still, the example turret control system 900 of FIG. 9 may include one or more elements, processes and/or devices in addition to, or instead of, those illustrated in FIG. 9, and/or may include more than one of any or all of the illustrated elements, processes and devices.

Figure 10:
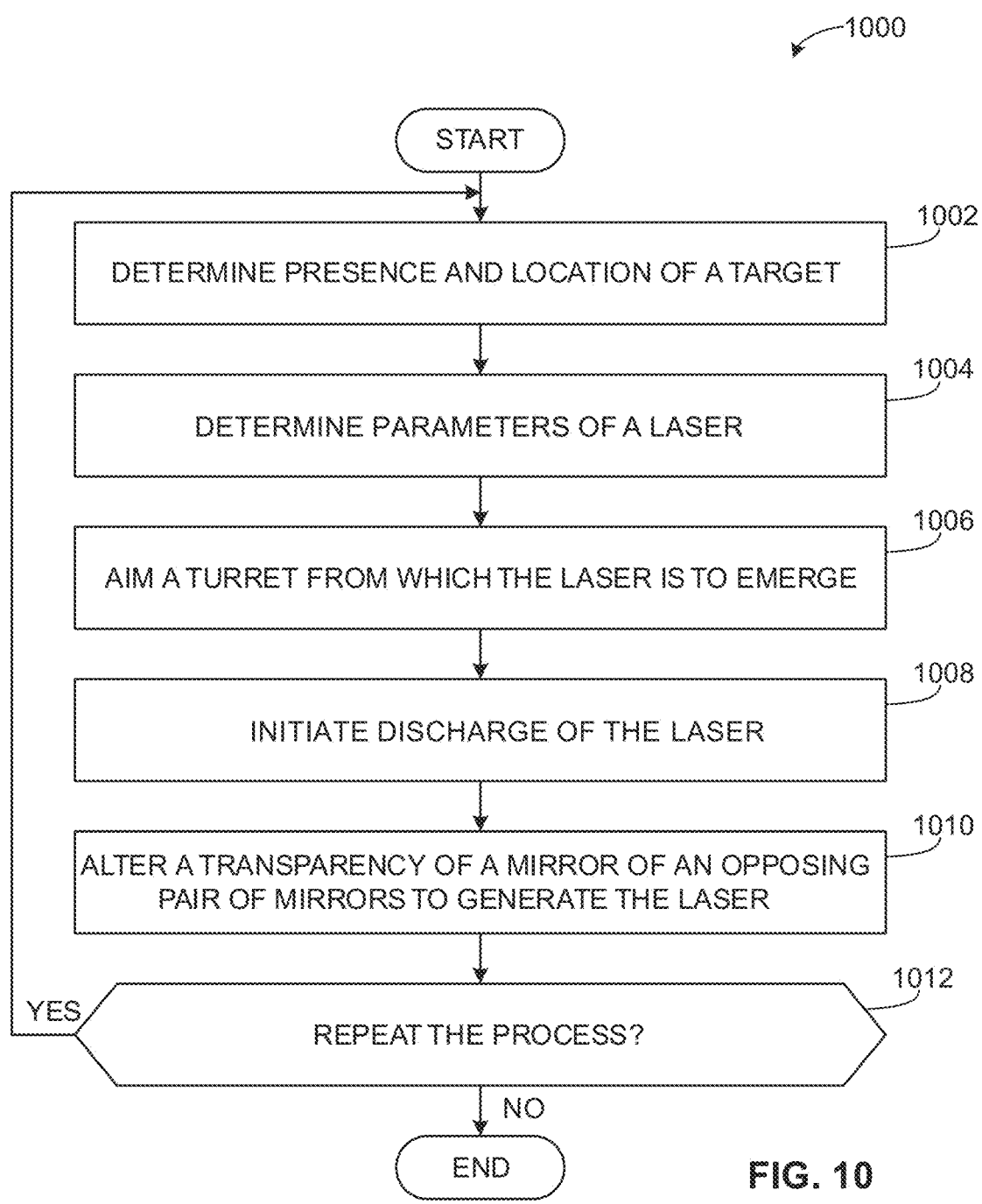
FIG. 10 is a flowchart representative of an example method that may be implemented by the example laser control system of FIG. 9.
Figure 11:
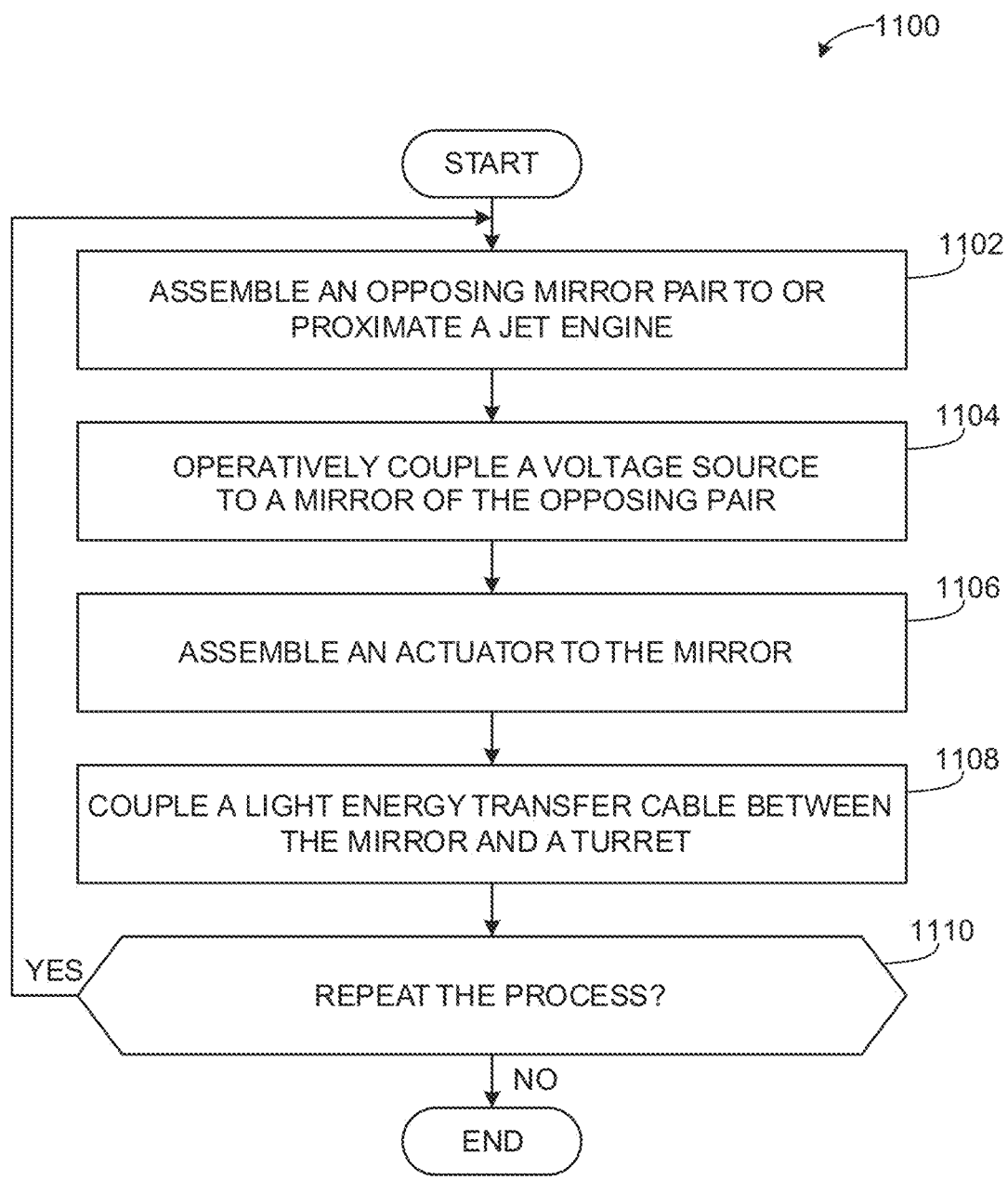
FIG. 11 is a flowchart representative of an example method that may be implemented to manufacture the example laser control system of FIG. 9.

Flowcharts representative of example methods for implementing the example turret control system 900 of FIG. 9 are shown in FIGS. 10 and 11. In this example, the methods may be implemented using machine readable instructions that comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 10 and 11, many other methods of implementing the example turret control system 900 may alternatively be used. For example, the order of execution of the blocks may be changed, and/or some of the blocks described may be changed, eliminated, or combined.

As mentioned above, the example methods of FIGS. 10 and 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 10 and 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

The example method 1000 of FIG. 10 begins as the aircraft 100, which is currently in flight, is about to emit/discharge a laser at a target (e.g., an air target). In this example, the jet engine 112 is burning fuel as thrust is generated to move the aircraft 100 forward.

According to the illustrated example, the turret aiming calculator 904 determines a presence and a location (e.g., a position, an estimated/predicted position, a target location) of a target (block 1002). For example, the turret aiming calculator 904 estimates a predicted location of the target at a future time based on a current measured/estimated speed and/or vector heading of the target.

In some examples, laser parameters are determined (block 1004). For example, the laser generation controller 906 may alter at least one parameter (laser frequency, laser strength, laser pulse duration, reflectivity patterns, etc.) based on sensor data received at the flight input/sensor interface 908. In some examples, laser parameters are adjusted to account for aberrations such as atmospheric aberrations. In some examples, pairs of opposing mirrors generate lasers at different frequencies from one another. In such examples, the light energy at different frequencies may be transported/carried over (e.g., multiplexed) on an optical cable (e.g., the optical cable 302) or multiple optical cables.

In this example, the turret 700 from which the generated laser is to emerge from is aimed (block 1006). In particular, the example turret aiming calculator 904 identifies a position and/or an estimated future position of the target to aim and/or direct the turret 700.

Next, a discharge of a laser is initiated (block 1008). In particular, once the presence and location (e.g., relative position) and/or predicted location of the target is determined/verified, the laser generation controller 906 initiates a laser emission from the example turret 700 based on the determined parameters.

According to the illustrated example, a transparency of a mirror of an opposing pair of mirrors is adjusted (e.g., reduced) to generate the laser (block 1010). In this example, a voltage is applied to the mirror to reduce its reflectiveness. Additionally or alternatively, the mirror is displaced and/or its shape is altered to vary the reflectiveness.

Next, it is determined whether to repeat the process (block 1012). If the process is to be repeated (block 1012), control of the process returns to block 1002. Otherwise, the process ends. This determination may be based on a presence of a target and/or an input signal received from a pilot of the aircraft 100.

Turning to FIG. 11, the example method 1100 begins as a laser firing system is being provided and/or assembled to a jet engine system of an aircraft (e.g., the aircraft 100). In this example, the laser system is being manufactured with the aircraft. However, in other examples, this laser system may be retrofitted onto an existing aircraft and/or a vehicle with a jet engine system.

According to the illustrated example of FIG. 11, an opposing mirror pair (e.g., a metamaterial mirror pair) is assembled to a jet engine (block 1102).

In this example, a voltage source is operatively coupled (e.g., assembled) to a mirror (e.g., an adjustable mirror) of the opposing mirror pair (block 1104). In this example, the voltage source is assembled to vary at least one optical property of the mirror when a voltage is applied to the mirror. In some examples, each of the mirrors of the opposing pair is assembled with a respective voltage source.

In other examples, an actuator (e.g., the actuator 606) and/or other movement device (e.g., a solenoid, etc.) is assembled and/or operatively coupled to the mirror (block 1106). In such examples, optical properties of the mirror vary based on a displacement and/or a change in shape of the mirror.

According to the illustrated example, a light energy transfer cable (e.g., the optical cable 302) is coupled/assembled/provided between the mirror and a turret (e.g., an omnidirectional turret) (block 1108). In some examples, multiple light energy transfer cables are coupled together (e.g., combined, separated/branched off, etc.).

Next, it is determined whether to repeat the process (block 1110). If the process is to be repeated (block 1110), control of the process returns to block 1102. Otherwise, the process ends. This determination may be based on whether additional opposing mirror pairs are to be assembled to the jet engine of the illustrated example.

Figure 12:
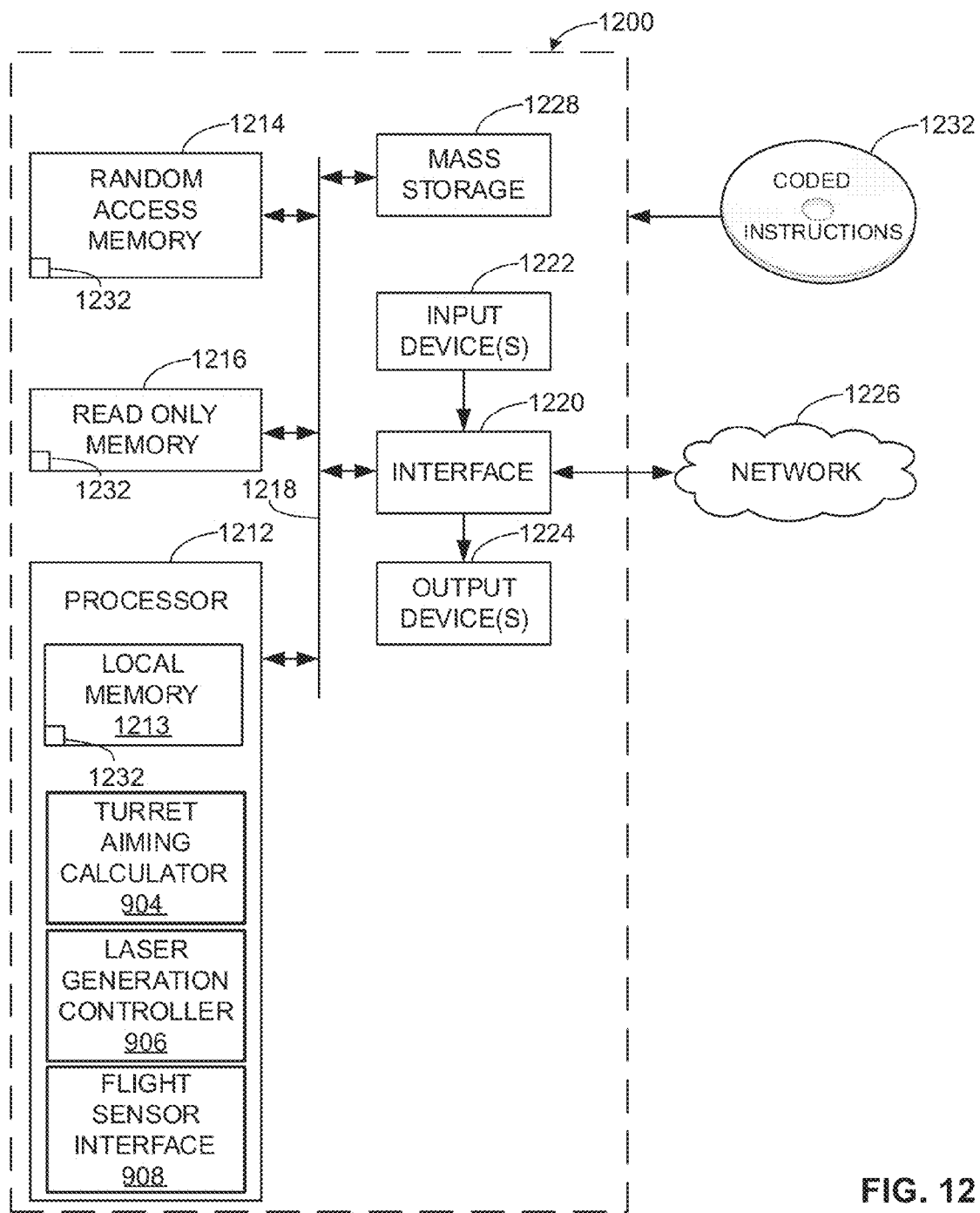
FIG. 12 is a processor platform that may be used to execute instructions to implement the methods of FIGS. 10 and/or 11 and the example laser control system of FIG. 9.

FIG. 12 is a block diagram of an example processor platform 1200 capable of executing instructions to implement the methods of FIGS. 10 and 11 and the example turret control system 900 of FIG. 9. The processor platform 1200 can be, for example, a server, a personal computer, a mobile device (e.g., a cell phone, a smart phone, a tablet such as an iPad™), a personal digital assistant (PDA), a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). In this example, the processor 1212 also includes the example turret aiming calculator 904, the example laser generation controller 906 and flight input/sensor interface 908. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 10 and 11 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture enable an effective and energy-efficient generation of a laser using a jet engine. In particular, the examples disclosed herein enable generation of a laser utilizing energy that is already produced in the jet engine, thereby reducing and/or eliminating the need for large, bulky and complex supporting equipment, which may be difficult to integrate into a vehicle, for example. The examples disclosed herein are cost-effective in manufacturing vehicles (e.g., aircraft) and may also be retrofitted to existing vehicles with jet engines.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are described in relation to aircraft, the examples disclosed herein may be applied to any appropriate application utilizing gas combustion and/or jet engines including spacecraft, boats, land vehicles, or any appropriate application(s).

What is claimed is:

1. An apparatus comprising:
a jet engine; and
first and second opposing mirrors exposed to an exhaust gas flow path of the jet engine, wherein at least one mirror of the first and second opposing mirrors is adjustable to generate laser light energy using exhaust gas of the jet engine.

2. The apparatus as defined in claim 1, further including a turret to emit the laser light energy.

3. The apparatus as defined in claim 2, further including a processor to direct an actuator to move the turret to aim the laser light energy.

4. The apparatus as defined in claim 1, wherein the first and second opposing mirrors include metamaterial.

5. The apparatus as defined in claim 4, further including an actuator to alter a shape of at least one of the first and second opposing mirrors to vary translucency of the at least one of the mirrors.

6. The apparatus as defined in claim 1, further including a fiber optic cable coupled to at least one of the first and second opposing mirrors.

7. The apparatus as defined in claim 1, wherein the first and second opposing mirrors are diametrically opposed across a housing of the jet engine.

8. An aircraft comprising:
an opposing mirror pair disposed within or proximate a jet engine of the aircraft; and
a translucency adjuster to alter a translucency of an adjustable mirror of the opposing mirror pair to generate laser light energy based on jet engine gas of the jet engine.

9. The aircraft as defined in claim 8, further including fiber optic cables coupling the adjustable mirror to a respective turret.

10. The aircraft as defined in claim 8, wherein the translucency adjuster includes an actuator to vary a shape of the adjustable mirror.

11. The aircraft as defined in claim 8, wherein the translucency adjuster includes a voltage source to vary a voltage applied to the adjustable mirror.

12. The aircraft as defined in claim 8, wherein the laser light energy is generated by focusing multiple mirrors to the adjustable mirror.

13. A method comprising:
determining a target location; and
generating a laser light beam aimed towards the target location from exhaust gas of a jet engine, the laser light beam to be generated using an opposing pair of mirrors disposed in or proximate the jet engine.

14. The method as defined in claim 13, further including directing an orientation of a turret from which the laser light beam emerges to aim the laser light beam.

15. The method as defined in claim 14, wherein directing the turret includes taking into account at least one of a vector or a predicted movement of a target corresponding to the target location.

16. The method as defined in claim 14, wherein the turret is omnidirectional.

17. The method as defined in claim 13, wherein the laser light beam is generated by altering a reflectivity of a mirror of the opposing pair of mirrors.

18. The method as defined in claim 17, wherein the reflectivity is altered by deflecting the mirror.

19. The method as defined in claim 17, wherein the reflectivity is altered by applying a voltage to the mirror.

20. A method comprising:
  assembling an opposing mirror pair to an internal surface of a jet engine; and
  coupling a light energy transfer cable between at least one mirror of the opposing mirror pair and a turret.

21. The method as defined in claim 20, further including assembling an actuator to one of the mirrors of the opposing mirror pair, the actuator to alter a shape of the mirror to alter a reflectivity of the mirror.

22. The method as defined in claim 20, further including operatively coupling a voltage source to one of the mirrors of the opposing mirror pair, the voltage source to alter a reflectivity of the mirror.

23. The method as defined in claim 20, wherein the turret is omnidirectional.

* * * * *